No. 813,323. PATENTED FEB. 20, 1906.
J. H. RIVERS.
FUMIGATING MATERIAL AND PROCESS OF MAKING SAME.
APPLICATION FILED APR. 21, 1905.

Witnesses:
Wm. H. Scott
W. A. Hilts

Inventor:
Julian H. Rivers
by J. D. Rippey
atty

UNITED STATES PATENT OFFICE.

JULIAN H. RIVERS, OF ST. LOUIS, MISSOURI, ASSIGNOR TO HYDRO-PRESS MANUFACTURING COMPANY, OF ST. LOUIS, MISSOURI, A CORPORATION OF MISSOURI.

FUMIGATING MATERIAL AND PROCESS OF MAKING SAME.

No. 813,323.     Specification of Letters Patent.     Patented Feb. 20, 1906.

Application filed April 21, 1905. Serial No. 256,805.

*To all whom it may concern:*

Be it known that I, JULIAN H. RIVERS, a citizen of the United States, residing at St. Louis, Missouri, have invented a new and useful Combustible Fumigating Material and Process of Making the Same, of which the following is a specification.

This invention relates to combustible fumigating materials and the process of making the same; and the object thereof is to produce an economical composite material combustion of which will create and emit an odorous gas or smoke, which when circulated among plants will destroy the life or vitality of all the insects among those plants without injury to or harmful effects upon the plant life. It is also intended for use in fumigating buildings, poultry-coops, and other inclosures which may be infested by insects.

The material is preferably formed into slabs of convenient size and shape with a number of the slabs united and folded together, thereby forming a hollow block. By placing the block upon one end and igniting the interior lower end the cavity will subserve the function of a short flue from which the fumigating-vapor emanates for circulation among the plants, buildings, or inclosures or other objects to be fumigated.

In the accompanying drawings, which form a part of this specification, I have shown a preferred arrangement of the material, though it is obvious other arrangements may be used, such being a matter of individual preference.

Figure 1:
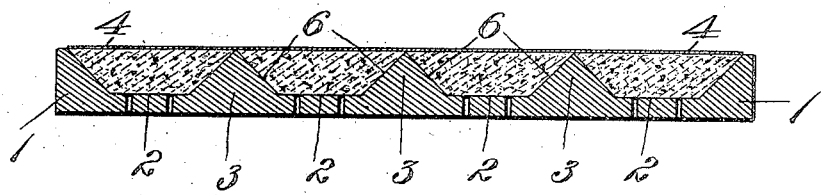
Figure 2:
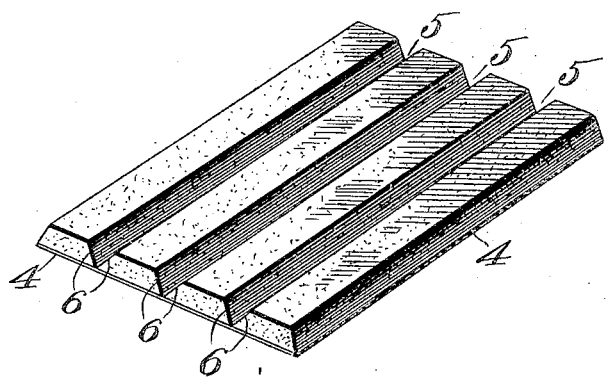
Figure 3:
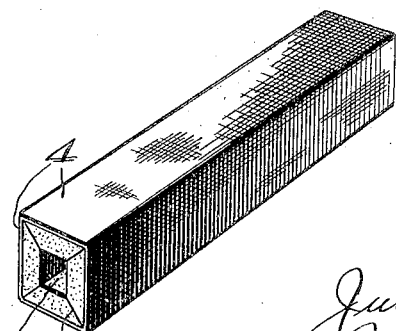

In the said drawings, Figure 1 is a sectional view of a mold employed to shape the material as desired, said mold being filled with the material. Fig. 2 is a perspective view showing the preferred formation of the material before being folded. Fig. 3 is a view in perspective of a series of four slabs folded together to form a finished block.

The material is preferably composed of the following ingredients in approximately the stated proportions by weight—viz., tobacco-dust, twelve parts; fibrous material or pulp or the like, three parts; nitrate of soda or potash or other oxygen-bearing substance, one part. If used for fumigating buildings or poultry-coops or other inclosures, a small quantity of sulfur added to the ingredients might be found advantageous. These ingredients are first ground into finely-divided particles and then mixed together with a suitable amount of water, producing a viscid mass. The mixture is agitated until the ingredients are thoroughly fused or blended, after which it is poured into molds or formers.

In practice I employ a mold 1, comprising a series of adjacent compartments 2, preferably of uniform size, and separated by inverted-V-shaped partitions 3. The bottom of the mold should be perforated in order to permit egress of the water. A flexible bond 4, such as gauze cloth or the like, is spread over the material, and then pressure is applied to compress the material within the mold to form slabs and in order to eject the water through the perforations in the mold and compact the material to the proper density. The material possesses more or less glutinous qualities, which, aided by the applied pressure, causes the bonding material 4 to adhere closely, thereby in a manner hinging the slabs together, as clearly shown in Figs. 1 and 2.

After having been properly compressed to become thoroughly adherent the slabs are removed from the mold and appear, as shown in Fig. 2, with V-shaped spaces 5 separating the slabs longitudially, the inclination of the edges 6 being preferably about forty-five degrees, so that the adjacent edges of two slabs form an angle of ninety degrees. The slabs are then folded to bring the edges 6 of the adjacent slabs together, and this adjustment forms a hollow block which is substantially square in cross-section with a passage 7 extending longitudinally therethrough, as shown in Fig. 3. The contacting edges of the side slabs may be united by glue, paste, or other viscid material applied thereto, or the adjustment may be maintained by some bond, such as a string or wire or the like, fastened around the finished hollow block. These blocks may be made in quantities in this manner. When finished, they are clean and easily handled. The bonding-cover strengthens the finished hollow block and facilitates its primary formation and also acts as a guard to prevent damage to or breakage of the blocks in handling.

When used, the blocks are mounted on end, preferably in some suitable metallic support, and the lower end of the blocks ignited, resulting in the emission of an odorous gas or smoke which is destructive to insect life, but harmless to plant life unless used to great excess. By causing the gas or smoke resulting from the combustion of the material to circulate among plants which are annoyed by insects or through buildings or inclosures infested thereby all the insects and their larvæ will be quickly destroyed, and by repeating the act at suitable intervals the plants, buildings, or inclosures may be kept entirely free from attack or invasion by destructive insects. When ignited, the material does not inflame greatly, but smolders like punk until reduced to ashes, all the time emitting great quantities of dense gaseous smoke.

I am aware that equally efficacious material may be made with reasonable variations from the process herein described and that the proportions of the elements may be changed within limits without in the least departing from the nature and principle of my invention. Therefore I do not wish to be understood as restricting myself to the identical steps in the process described or to the exact proportions of the ingredients used.

Having described my invention, what I claim as new, and desire to secure by Letters Patent, is—

1. As an article of manufacture a hollow block composed of tobacco, fibrous pulp, and nitrate of potash.

2. As an article of manufacture, a hollow block composed of tobacco, fibrous pulp, and nitrate of potash, and a bonding-cover, substantially as specified.

3. The process of making fumigating material composed of tobacco, fibrous pulp and nitrate of potash, which consists in mixing the required proportions of the said substance together in water, shaping the mixture into slabs and binding the slabs together.

4. A combustible fumigating-block, comprising a plurality of slabs having beveled edges and of which the component elements are tobacco, fibrous pulp, and nitrate of potash, and a bonding-cover adapted to hold the beveled edges of the slabs together, as required to form a hollow rectangular block.

5. A combustible fumigating-block consisting of tobacco, fibrous pulp, and nitrate of potash mixed together to form slabs, and a bonding-cover to hold a plurality of slabs together.

6. A combustible fumigating-block consisting of tobacco, fibrous pulp, and nitrate of potash mixed together and shaped into elongated hollow form, and a bonding-cover inclosing the sides of the hollow block.

7. A hollow combustible object, comprising tobacco-dust, fibrous material, an oxygen-bearing element, and sulfur mixed together and solidified to form an elongated hollow block, and a bonding-cover inclosing the block.

8. As an article of manufacture, a hollow block composed of tobacco, fibrous material, an oxygen-bearing element, and a bonding-cover inclosing the block, substantially as specified.

9. A combustible fumigating-block composed of tobacco, fibrous material, and an oxygen-bearing element mixed together and compressed into slabs, a plurality of said slabs being arranged into open-ended box form, and a bonding-cover holding said slabs in box form, substantially as described.

In testimony whereof I have signed my name to this specification in the presence of two subscribing witnesses.

JULIAN H. RIVERS.

Witnesses:
E. H. MICHEL,
F. J. McCASLIN.